US008041994B2

(12) United States Patent
Grinshpun et al.

(10) Patent No.: US 8,041,994 B2
(45) Date of Patent: Oct. 18, 2011

(54) ASYNCHRONOUS CHECKPOINTING WITH AUDITS IN HIGH AVAILABILITY NETWORKS

(75) Inventors: Ed Grinshpun, Freehold, NJ (US); Sameer Sharma, Holmdel, NJ (US); Paul Wilford, Bernardsville, NJ (US)

(73) Assignee: Alcatel Lucent, Paris (FR)

( * ) Notice: Subject to any disclaimer, the term of this patent is extended or adjusted under 35 U.S.C. 154(b) by 205 days.

(21) Appl. No.: 12/318,850

(22) Filed: Jan. 9, 2009

(65) Prior Publication Data
US 2010/0180106 A1    Jul. 15, 2010

(51) Int. Cl.
*G06F 11/00* (2006.01)
(52) U.S. Cl. .......................................... 714/15; 714/4.11
(58) Field of Classification Search ................... 714/15, 714/4.11, 4.12
See application file for complete search history.

(56) References Cited

U.S. PATENT DOCUMENTS

| 6,026,499 | A  | * | 2/2000  | Shirakihara et al. ............. 714/11 |
| 6,175,876 | B1 | * | 1/2001  | Branson et al. ................. 709/252 |
| 6,823,474 | B2 | * | 11/2004 | Kampe et al. ................... 714/13 |
| 6,877,111 | B2 | * | 4/2005  | Sharma et al. .................. 714/13 |
| 7,657,578 | B1 | * | 2/2010  | Karr et al. ...................... 707/610 |
| 7,743,381 | B1 | * | 6/2010  | Tran ............................... 718/106 |
| 7,779,298 | B2 | * | 8/2010  | Challenger et al. ............. 714/15 |
| 2003/0023898 | A1 | * | 1/2003  | Jacobs et al. ................... 714/15 |
| 2003/0046342 | A1 | * | 3/2003  | Felt et al. ...................... 709/203 |
| 2005/0015663 | A1 | * | 1/2005  | Armangau et al. ............. 714/15 |
| 2005/0160315 | A1 | * | 7/2005  | Chandrasekaran et al. .... 714/15 |
| 2006/0168473 | A1 | * | 7/2006  | Sahoo et al. .................... 714/15 |
| 2007/0277056 | A1 | * | 11/2007 | Varadarajan et al. ........... 714/15 |
| 2009/0327807 | A1 | * | 12/2009 | Varadarajan et al. ........... 714/15 |

OTHER PUBLICATIONS

"Media Access Control (MAC) Bridges." 802.1D IEEE Standard for Local and Metropolitan Area Networks. IEEE Computer Society. Jun. 9, 2004.

* cited by examiner

*Primary Examiner* — Yolanda L Wilson
(74) *Attorney, Agent, or Firm* — Harness, Dickey & Pierce, P.L.C.

(57) ABSTRACT

Example embodiments are directed to methods of ensuring high availability of a network using asynchronous checkpointing of application state data related to an object. Example embodiments include a method of asynchronous checkpointing application state data related to at least one object, including receiving application events and processing the application events to obtain new application state data. The method further includes modifying at least a portion of previously stored application state data and asynchronously and independently checkpointing the modified application state data based on whether the modified application state data has reached a stable state. Example embodiments also include a method of ensuring consistent application state data across a network. This method may include having at least two CAPs independently and asynchronously storing application state data related to at least one object at two different network nodes and automatically auditing the stored application state data to ensure data consistency.

13 Claims, 5 Drawing Sheets

ASYNCHRONOUS CHECKPOINTING WITH AUDITS IN HIGH AVAILABILITY NETWORKS

BACKGROUND

Telecommunication service providers typically measure equipment High Availability (HA) as a percentage of time per year that equipment provides full services. When calculating system downtime, service providers include hardware outages, software upgrades, software failures, etc. Typical requested equipment requirements to equipment vendors are: 99.999% ("5"-nines availability), which translates into about 0.001% system downtime per year (~5.25 min per year) and 99.9999% ("6"-nines availability), which translates into about 0.0001% system downtime per year (~31 sec per year). Typically for highly sensitive applications 1+1 redundancy (1 redundant (standby) equipment piece (device) for each active equipment piece (device)) is implemented in an attempt to protect the service provider from both hardware and software failures. To allow for cost savings, N+1 redundancy schemes are often also used (1 redundant (standby) for each N active). The standby equipment replicates the corresponding active equipment.

Real time embedded system software is organized as multiple Cooperating Application Processes (CAPs), each handling one of a number of functional components, such as: 1) Networking protocols, including, e.g., mobile IP (MIP), Layer 2 bridging (spanning tree protocol (STP), generic attribute registration protocol (GARP), GARP virtual LAN (VLAN) registration protocol (GVRP)), routing/multi-protocol label switching (MPLS), call processing, and mobility management, etc.; 2) Hardware forwarding plane management (e.g., interfaces, link state, switch fabric, flow setup, etc.); and 3) operations, administration, and maintenance (OA&M), e.g., configuration and fault/error management, etc. To provide end-to-end services, a network provider has to configure multiple network nodes. Each of these nodes is an embedded system and has embedded application software implemented as CAPs.

FIG. 1A illustrates a portion of a known 1+1 redundancy network in which data is routed through various nodes A, B, C, and D, where each node includes various combinations of different CAPs. As shown, B provides 1+1 redundancy for A and D provides 1+1 redundancy for C. At any given time, either A or B is active, but not both. At any given time either C or D is active, but not both.

FIG. 1B illustrates a portion of a known N+1 redundancy network in which data is routed through various nodes A, B, C, and D, where each node includes various combinations of different CAPs. As shown, D provides N+1 redundancy for A, B and C. If A, B or C goes down, traffic with go through D.

Dynamic object state information (e.g. calls, flows, interfaces, VLANs, routes, tunnels, mobility bindings, etc.), which is maintained by a software application, is distributed across multiple CAPs and across control and data planes. Each CAP manages and owns a subset of state information pertaining to the software application. The logistics of functional separation is typically dictated by product and software specific considerations. Data synchronization across CAPs is achieved via product-specific forms of Inter-Process Communication (IPC).

Software support is critical for achieving HA in embedded systems. Hardware redundancy without software support may lead to equipment "Cold Start" on failure during which services may be interrupted and all the service related dynamic persistent state data (e.g., related to active calls, routes, registrations, etc.) may be lost. The amount of time to restore service may include, a system reboot with saved configuration, re-establishment of neighbor relationships with network peers, re-establishment of active services, etc. Depending upon the amount of configuration needed, restoration often takes many minutes to completely restore services based on "Cold Start". Various system availability models demonstrate that a system can never achieve more than 4-nines HA (99.99% availability) when using a "Cold Start".

Software requirements for "6"-nines HA generally include sub 50 msec system downtime on CAP restart, software application warm start, controlled equipment failover from Active to Standby nodes and not more than 3-5 sec system downtime on software upgrades and uncontrolled equipment failover. The sub 50 msec requirements are often achieved via separation of the control and data planes. For example, the data plane would continue to forward traffic to support active services while the control plane would restart and synchronize the various applications.

SUMMARY

Example embodiments are directed to methods of ensuring HA of a network using asynchronous checkpointing of application state data related to objects. Example embodiments include a method of asynchronous checkpointing application state data related to at least one object by all the CAPs handling this object, including CAPs receiving and processing the application events to reflect in real time new or modified application object state data. The method further includes CAP(s) asynchronously and independently checkpointing the modified application state data, once at least a portion of previously stored application state data changes and based on whether the application state data has reached a stable state.

Example embodiments also include a method of ensuring consistent application state data across multiple CAPs and across Active and Standby Network nodes. This method may include having at least two CAPs independently and asynchronously checkpointing application state data related to at least one object and automatically auditing the stored application state data to ensure data consistency.

BRIEF DESCRIPTION OF THE DRAWINGS

Example embodiments will be more clearly understood from the following detailed description taken in conjunction with the accompanying drawings. FIGS. 1-6 represent non-limiting, example embodiments as described herein.

FIG. 2 is a flow chart of a method of asynchronously checkpointing and auditing application state data according to example embodiments;

FIG. 3 illustrates data flow in a control plane and a data plane including various CAPs according to example embodiments;

FIG. 4 is an application message flow diagram for according to example embodiments;

FIG. 5 illustrates various examples of audit flows according to example embodiments;

FIG. 6 shows example embodiments of Type I to III audits.

DETAILED DESCRIPTION

Figure 1A:
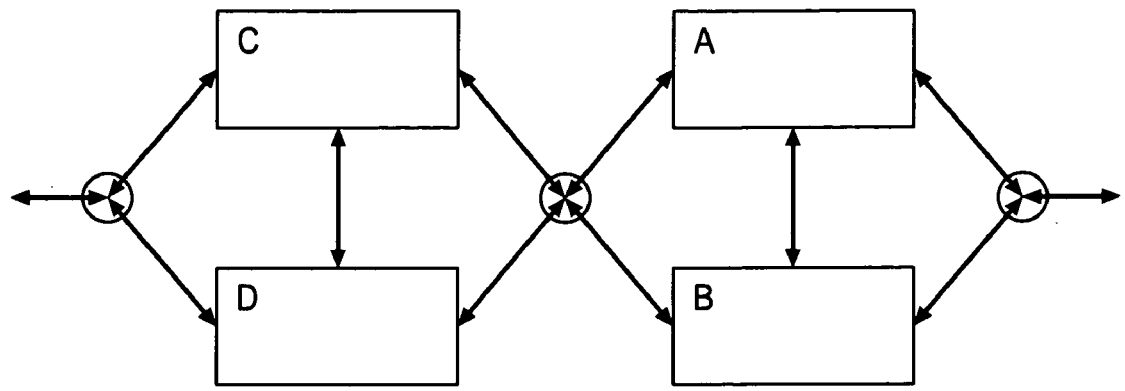
FIG. 1A illustrates a conventional system diagram in which example embodiments may be used.
Figure 1B:
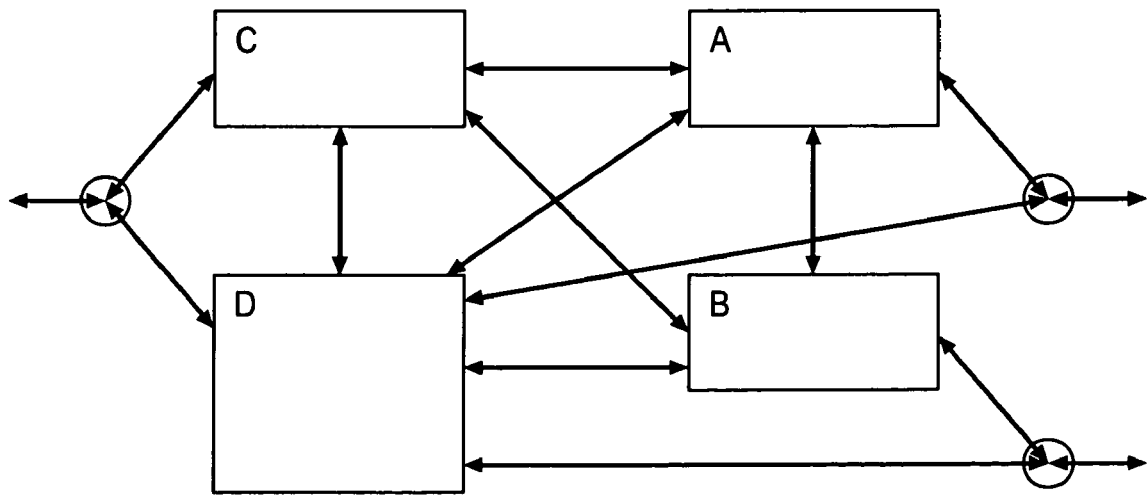
FIG. 1B illustrates a conventional system diagram in which example embodiments may be used.

Various example embodiments will now be described more fully with reference to the accompanying drawings in which some example embodiments are illustrated. In the drawings, the thicknesses of layers and regions may be exaggerated for clarity.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, e.g., "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Example embodiments are directed to methods of Asynchronous Checkpointing with Audits (ACWA). The ACWA model operates under known embedded system assumptions, for example, that persistent application data is distributed across multiple cooperating application processes (CAPs), as discussed above, with each process "owning" a subset of the data. Data synchronization for the state information related to the same object(s) managed across different CAPS is performed via custom Inter-Process Communication mechanisms.

Figure 2:
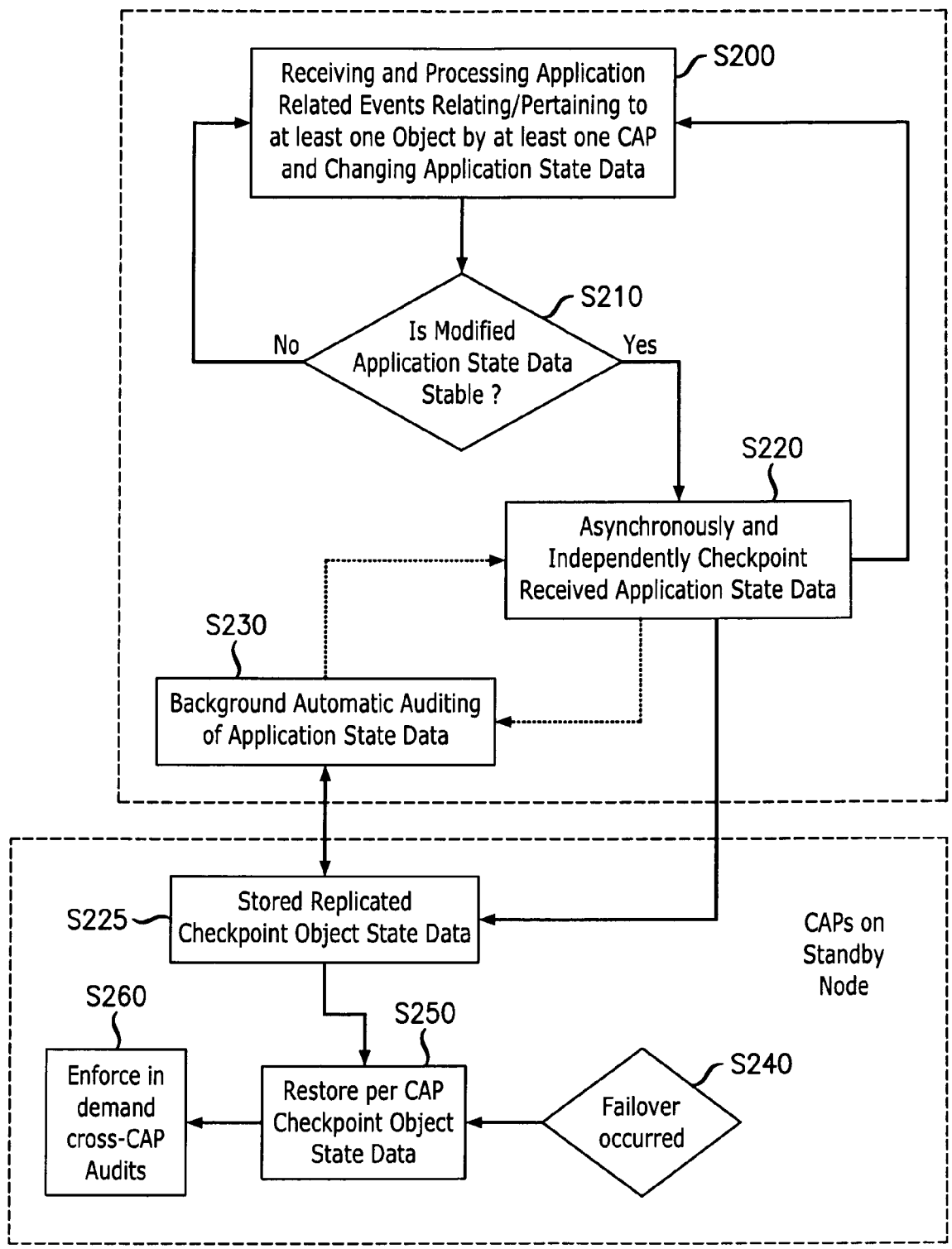

FIG. 2 illustrates an example flow for the ACWA model. Initially, at least one CAP processes application related events pertaining to at least one object at S200. Also at S200, the at least one CAP changes and/or modifies the application state data affected by the processed events. Each CAP independently manages a subset of state information (records) pertaining to the specified software application.

Next, the CAP independently determines if its subset of state data (both modified and not) has reached a "stable state" at step S210. If the subset of state data has not reached a stable state, then the CAP continues to wait to process more events returning to step S200. The determination of a "stable state" depends on the specific CAP and object corresponding to the state data at issue.

For example, depending on the CAP and corresponding object, the CAP will checkpoint the state data at different times and based on different levels of modification. Stable and transient states are generally application and object specific and depend upon the chosen state recovery scheme. Checkpointed stable states may be recovered during application fallback to last known stable state, while non-checkpointed transient states shall be lost on recovery.

If the subset of state data has reached a stable state, then the CAP independently and asynchronously checkpoints the corresponding subset of the state data that it manages at step S220. Checkpointing is a technique for inserting fault tolerance into computing systems by storing a snapshot of the current application state, and using the checkpointed data for restarting in case of failure. Checkpointing may include, e.g., checkpointing to local non-volatile memory storage and checkpointing to remote network storage (shown replication to Standby node storage S225)

At a point later in time, various types of automated background audits may run to verify consistency of the checkpointed state data as shown in step S230. Example embodiments of the automated background audits will be discussed in more detail below. If the network has an equipment failover at S240 then CAPs on a standby node restore the CAP object state data based upon previously checkpointed active node CAP object state data (replicated from active), and on demand audits of restored object state data across CAPs are enforced to verify the object state data consistency after failover. At S250, the standby node assumes functions of failed active node and for each CAP the dynamic object's state is restored from the replicated checkpointed object state data from the active node. At S260, cross-CAP audits are performed on new active node (former standby) to verify that the restored object state data (recovered from asynchronously checkpointed data by the former active CAPs) is consistent. These audits allow to recover from object state inconsistencies for those objects (with state distributed across multiple CAPS) which state transition occurred in a short period of time preceding the failover, leading to inconsistency in asynchronously checkpointed subsets of state data.

Equipment failover may include, e.g., controlled failovers, uncontrolled failovers (e.g., Standby node detects Active node crash/power failure and takes over), maintenance procedures (e.g., software/firmware upgrades), and software restarts of the control plane without hardware redundancy. In any of these equipment failover examples, the goal is to have as close to zero downtime as possible to maintain HA.

Figure 3:
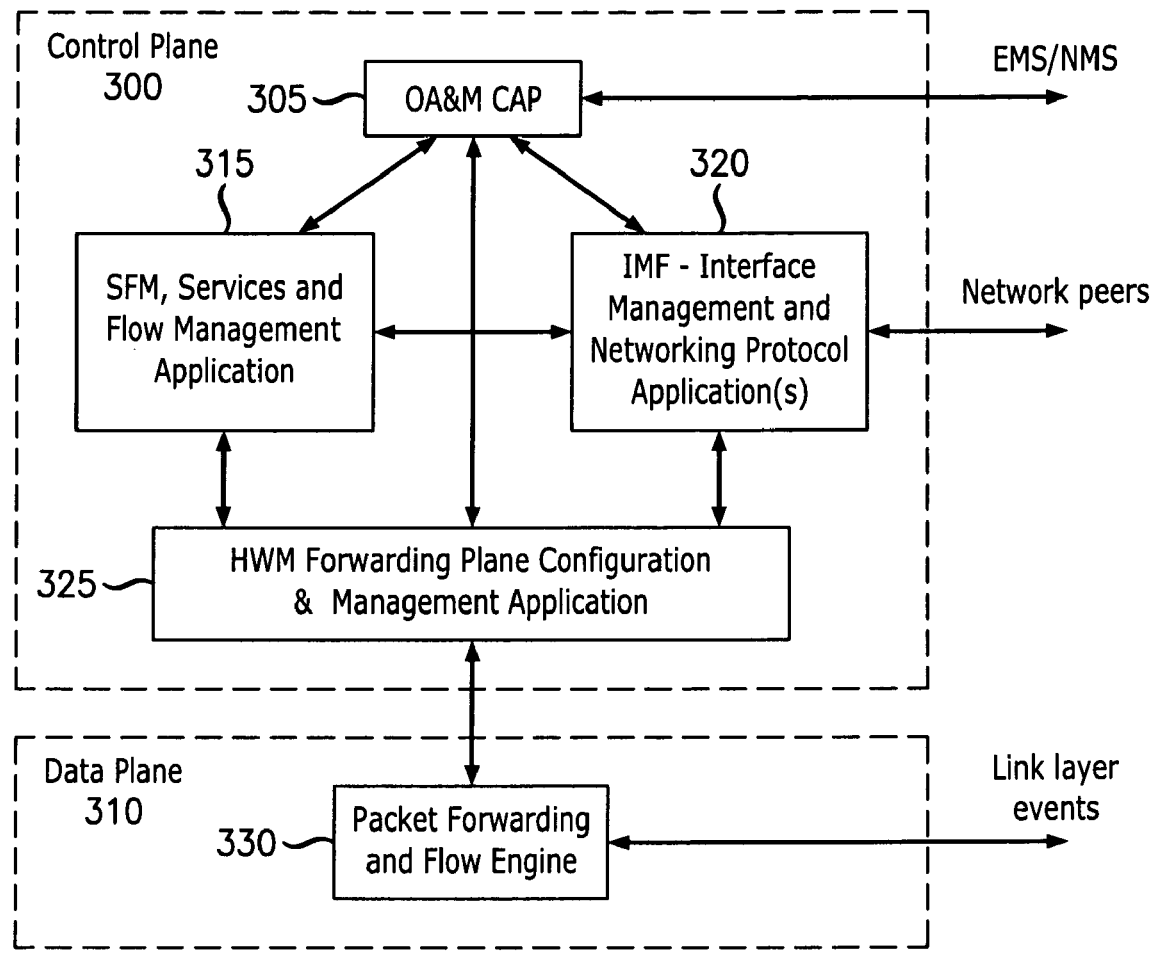

FIG. 3 shows an example of the relationship between an OA&M CAP 305, various types of CAPs 315, 320, 325, and 330, a control plane 300, a data plane 310, and other network elements (not shown). The hardware-based data plane 310 (including different network nodes, e.g., FPGAs, Network Processor) may implement a bearer traffic packet forwarding and flow engine 330 and perform asynchronous exchange of data plane configuration and link state related events with the Hardware Manager (HWM) CAP 325 in the control plane 300.

The OA&M CAP 305 implements a product and application specific OA&M interface to an Element/Network Management Station (EMS/NMS). Depending upon product-specific requirements, one of or a combination of SNMP, HTTP, CLI, XML based OA&M interfaces may be used.

The HWM CAP 325 may implement a hardware abstraction layer, hiding hardware specifics and dependencies from the higher layer applications (e.g., hardware forwarding plane might be using a variety of network processors, multi-core processors, FPGAs, DSPs, ASICs, etc., while higher layer protocol software remains unchanged). The HWM CAP 325 receives asynchronous events from the OA&M CAP 305, the services and flow management (SFM) CAP 315 and the interface manager and networking protocol (IFM) CAP 320 to configure the data plane, based upon user configuration and networking protocol specific logic.

For example, in a bridging application, a user may configure a VLAN logical interface (LIF) via the OA&M CAP 305 as administratively up (e.g., forwarding traffic). However, based upon a Spanning Tree protocol exchange, the IFM CAP 320 might request to bring the LIF down (e.g., not forwarding traffic). The Spanning Tree protocol, as defined in IEEE 802.1D, eliminates user plane loops in the network that would be looped indefinitely instead of being forwarded to a destination.

A user plane is a forwarding mechanism for end user traffic. It is typically separate from the control plane, which is a set of protocols defined to establish the user plane. Once the user plane is established, end user data traffic is forwarded.

Based upon link state information, the HWM CAP 325 might report the link for the LIF to be down as well. Another example is a routing application in which a user configures an IP interface to be up via the OA&M CAP 305. The IFM CAP 320 then configures new flows after learning routing information from a network peer via Open Shortest Path First (OSPF). OSPF is one of IP routing link-state protocols as defined in the IETF standards.

According to an example embodiment, the IFM CAP (or several CAPs) 320 implements product-specific networking protocol functionality and manages interface tables and interface stacking relationships. Generally, networking equipment manages interface tables defined by corresponding IETF standards for types of physical and logical interfaces a device contains. An interface protocol stack may define the stacking relationship between physical and logical interfaces. As should be understood, several CAPS may implement product-specific networking protocol functionality.

The IFM CAP 320 also exchanges asynchronous events with networking protocol peers to learn/advertise protocol specific information. Networking protocols (e.g., routing protocols, Bridging, MPLS, Mobile IP, AAA) allow network devices to exchange a variety of service related state information between network nodes. The IFM CAP 320 also receives asynchronous events from the OA&M CAP 305 and exchanges asynchronous events with the SFM CAP 315 and the HWM CAP 325.

The SFM CAP 315 realizes and manages product-specific services and flows. The SFM CAP 315 may be configured by a user via the OA&M APPLICATION 305. The SFM CAP 315 also collects per service and flow accounting/charging statistics from HWM using product-specific IPC mechanisms. In the example provided in FIG. 3, the HWM CAP 325 collects traffic statistics from forwarding plane and reports to the SFM CAP 315. The SFM CAP 315 also exchanges asynchronous events with the OA&M APPLICATION 305, the IFM CAP 320, and the HWM CAP 325.

An example of a logical interface object (LIF) associated with a bridging service may have information distributed across the SFM CAP 315, IFM CAP 320, and HWM CAP 325. The SFM CAP 315 may include logical interface state information, for example, configuration (MIB—Management Information Base) data (e.g., ifname, associated physical interface (slot/port number), VLAN id, admin status, etc.) and dynamic persistent data.

The IFM CAP 320 may include dynamic persistent data (e.g., ifindex, shadowed admin status, oper status, ifname, iftype). Finally, the HWM CAP 325 may include, dynamic persistent data (e.g., related hardware data path configuration, ifindex, admin status (directly from the hardware drivers), oper status (directly from the hardware drivers), and link status of the underlying physical interface (directly from the hardware drivers)). The iftable is a collection of all interfaces and the ifindex is a way of referring to the interfaces.

Admin status signifies a state of the interface administratively provisioned by the operator. Oper status signifies an actual state of the interface. For example, the operator may configure admin status of an interface as UP (active), but oper status may be down because the physical link is down.

Figure 4:
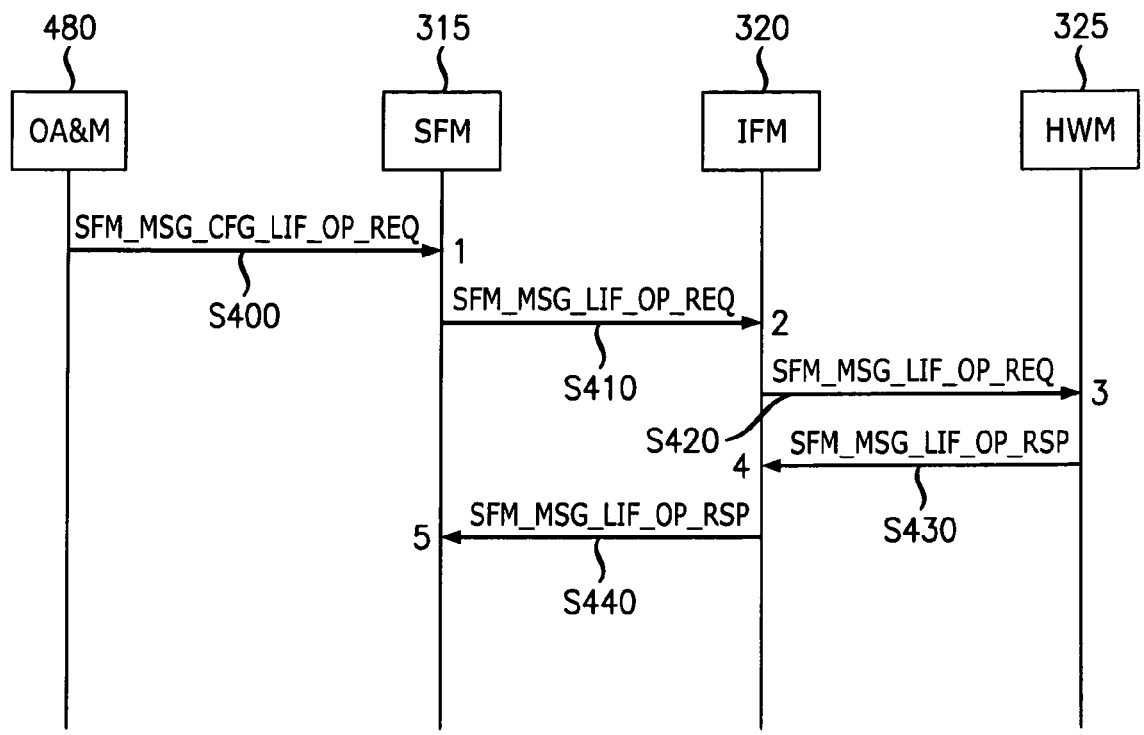

FIG. 4 illustrates a sample message flow diagram for LIF creation. In step S400, LIF creation command (e.g., an IPC message) comes from an OA&M client 480 CAP to the SFM CAP 315, containing associated physical interface port/slot number and associated VLAN id. The SFM CAP 315 creates a local object instance for the LIF, and initializes its local state machine. The SFM CAP 315 then forms an IPC request message and sends the message to the IFM CAP 320 in step S410.

The IFM CAP 320 then creates a LIF in the admin down state and a new row in the iftable for the new LIF. The IFM CAP 320 also updates the iftable to reflect the LIF and physical interface relationship and assigns an ifindex for the new LIF. The IFM CAP 320 then appends the ifindex to the IPC message and forwards the IPC message to the HWM CAP 325 in step S420.

The HWM CAP 325 creates a local LIF object instance and adds a new LIF to the list of LIFs associated with the given physical interface. The HWM CAP 325 then creates a LIF instance in the data plane in the admin down state using the corresponding interface to configure the actual User plane. Next, the HWM CAP 325 sends a response back to the IFM CAP 320, containing a new LIF ifindex, admin, and oper state, in step S430.

Upon receipt of the response, the IFM CAP 320 updates the LIF admin and oper state in the iftable and ifstack table. The IFM CAP 320 then forwards the IPC response to the SFM CAP 315. The SFM CAP 315 receives the response and updates the local state information for the LIF.

The LIF admin status up/down flow procedures may be triggered e.g., by the OA&M CAP 305 or by Spanning Tree calculation by the IFM CAP 320. Regardless of how the procedures are triggered, each CAP independently maintains internal stable states of the LIF. Once the LIF in a CAP reaches a stable state, the CAP independently checkpoints the relevant object state. For example, in FIG. 4, the SFM CAP 315 may perform a checkpoint in steps S400 and S440, HWM CAP 325 may perform a checkpoint in step S420, and IFM CAP 320 may perform a checkpoint in step S430.

Figure 6:
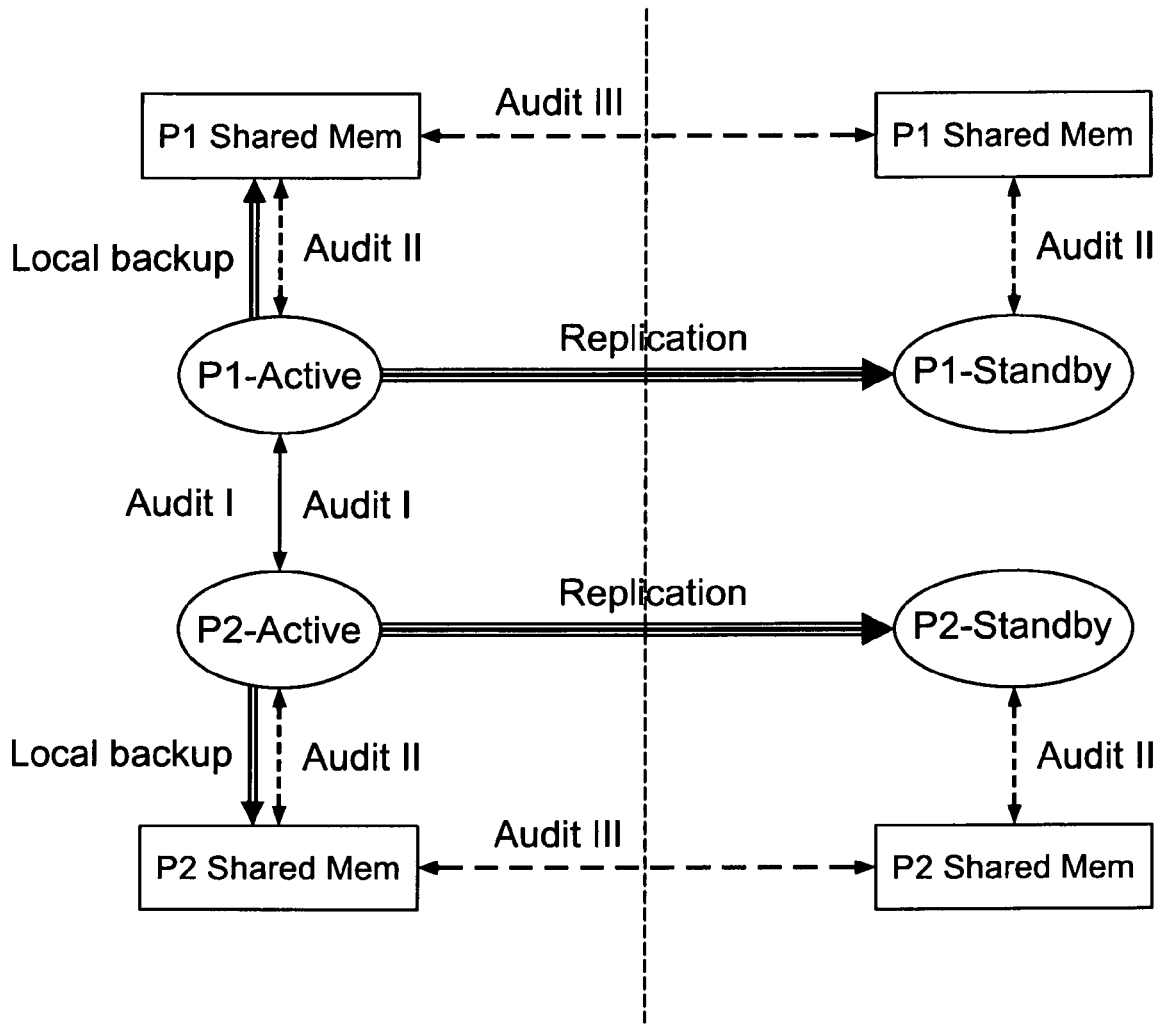

Audits as described below are used to ensure data consistency: across CAPs for application objects, between control and data planes and between CAP runtime data and stored/replicated checkpointed data. Audits are typically performed for bulk application objects and compare a relevant subset of application object state data between the various CAPs, nodes and/or memories to ensure consistency of distributed object state data. There are 4 recommended audit types, types I-III are shown in FIG. 6. Type I audits must be used if two or more CAPs are involved and Type II, III, and IV increase reliability and decrease recovery time on failover.

The first audit is a type I audit, which is used vertically across CAPs P1-Active, P2-Active to verify run-time data consistency of subsets of the object state data managed by different CAPs. The same audit may be used for run-time active applications on initialization of a standby module after failover (see FIG. 2). The audit may be initiated in bulk (periodically in the background and on demand) by the owner CAP towards other member CAPs. Furthermore, type I audits may be background audits across CAPS that are performed following the "natural" application and product specific IPC flow, based upon the object-related parent-child hierarchy established during registration with the automation framework.

The second audit is a type II audit, which is used between run-time application data and locally checkpointed "packed" configuration and dynamic persistent data records for the same object in the context of each CAP. In FIG. 6, e.g., between P1-Active and P1-Shared Memory, P1-Standby and P1-Shared Memory, P2-Active and P2 Shared Memory, P2-Standby and P2 Shared Memory, audit type II may be used. The third audit is a type III audit, which is used between locally checkpointed per CAP data and replicated (e.g., 1+1 or N+1 redundancy) data for the same HA object identifier. The HA object identifier identifies the CAP owner and object.

Figure 5:
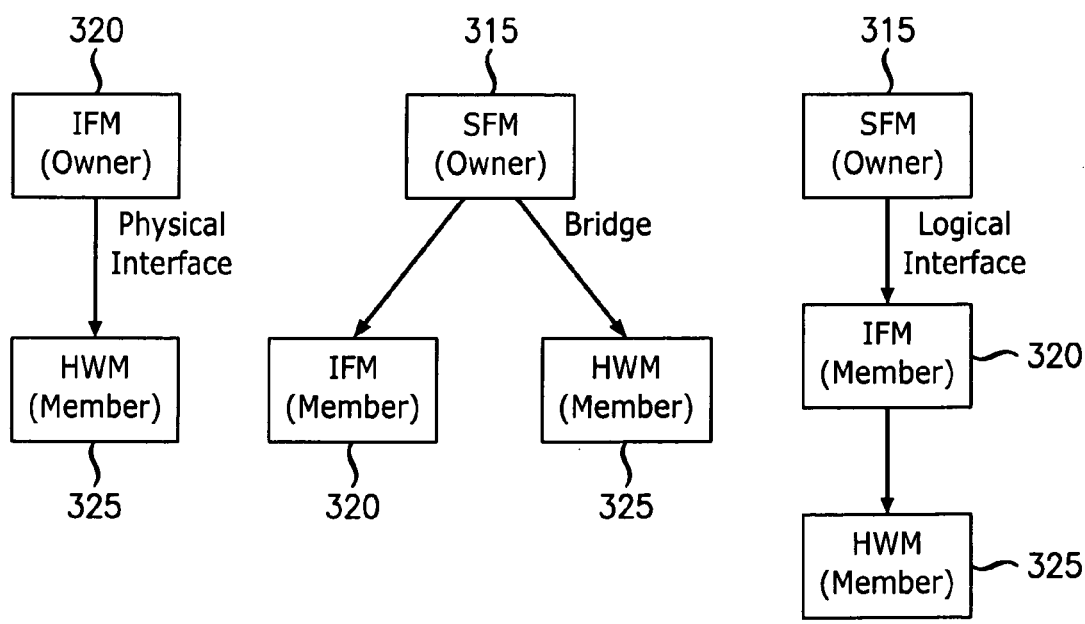

Finally, the fourth audit is a type IV audit, which is used for orphaned records (e.g., records that were not scanned for a certain period of time by the type I audits) for the same object and CAP. Automated consistency audits across CAPs for a particular object type (after failover and during runtime) follow the registered application hierarchy as shown in FIG. 5.

Example embodiments of the present invention being thus described, it will be obvious that the same may be varied in many ways. Such variations are not to be regarded as a departure from the spirit and scope of the exemplary embodiments of the invention, and all such modifications as would be obvious to one skilled in the art are intended to be included within the scope of the invention.

What is claimed is:

1. A method of asynchronous checkpointing application state data related to at least one object, comprising:

receiving application events related to the at least one object by at least one cooperating application process (CAP) at a network node;

processing the received application events to obtain new application state data;

modifying at least a portion of a previously stored set of application state data with the new application state data; and asynchronously and independently checkpointing the modified application state data based on whether the modified application state data has reached a stable state.

2. The method of claim 1, further including:
repeating the asynchronously and independently checkpointing step.

3. The method of claim 1, wherein the application state data is a subset of a larger set of application state data.

4. The method of claim 1, wherein the checkpointed application state data is stored at a local network node and at a remote network node.

5. The method of claim 1, further including:
automatically auditing the checkpointed state data.

6. The method of claim 5, wherein, the automatically auditing includes,
running at least one of the following types of audits, I) auditing run-time data consistency of the object data across at least a second CAP and the at least one CAP, II) auditing between run-time data and locally checkpointed data for the at least one CAP, III) auditing locally checkpointed data and remotely stored data for a specific object, and IV) auditing non-specific records for the same object.

7. A method of ensuring consistent application state data across CAPs in the same network element, and between Active(s) and Standby network nodes comprising:
independently and asynchronously, by at least two CAPs, storing subsets of application state data related to at least one object at different network nodes;
checkpointing at least one of the subsets of application state data based on whether the at least one of the subsets of application state data has reached a stable state; and
automatically auditing the stored application state data to ensure data consistency.

8. The method of claim 7, wherein, the automatically auditing includes,
running at least one of the following types of audits, I) auditing run-time data consistency of the object data across the at least two CAPs, II) auditing between run-time data and locally checkpointed data for at least one of the at least two CAPs, III) auditing locally checkpointed data and remotely stored data for a specific object, and IV) auditing non-specific records for the same object.

9. The method of claim 7, wherein automatically auditing further includes,
restoring the application state data of the at least one object after one of the different network nodes fails by synchronizing the application state data between the at least two CAPs.

10. The method of claim. 9, wherein the restoring includes state data related to multiple objects.

11. The method of claim 7, wherein the stored dynamic persistent application state data are different subsets of a larger set of dynamic persistent application state data related to the object.

12. The method of claim 11, wherein the different subsets of dynamic persistent application state data are stored by different CAPs.

13. A method of ensuring high availability of a network comprising:
applying the method of claim 7 to at least a portion of nodes across the network.

* * * * *